United States Patent [19]

Landry

[11] Patent Number: 4,567,634

[45] Date of Patent: Feb. 4, 1986

[54] TOOL FOR COMPRESSING VALVE SPRINGS

[76] Inventor: William H. Landry, 58 Betts Rd., Belmont, Mass. 02178

[21] Appl. No.: 632,221

[22] Filed: Jul. 18, 1984

[51] Int. Cl.[4] .............................................. B23P 19/04

[52] U.S. Cl. .......................................... 29/220; 29/267

[58] Field of Search ......................... 29/219, 220, 267; 254/25, 131; 81/3 R

[56] References Cited

U.S. PATENT DOCUMENTS

| | | | |
|---|---|---|---|
| 486,300 | 11/1892 | Scheid | 254/25 X |
| 1,370,397 | 3/1921 | Axelton | 29/220 |
| 1,438,791 | 12/1922 | Seppmann | 29/220 |
| 1,516,712 | 11/1924 | Cochran | 29/220 |
| 2,311,956 | 2/1943 | Miller | 29/220 |
| 3,295,193 | 1/1967 | Maness | 29/220 |
| 3,873,067 | 3/1975 | Carpio et al. | 29/219 X |

FOREIGN PATENT DOCUMENTS

| | | | |
|---|---|---|---|
| 353135 | 9/1905 | France | 29/220 |

*Primary Examiner*—Frederick R. Schmidt
*Assistant Examiner*—Steven P. Schad
*Attorney, Agent, or Firm*—Joseph S. Iandiorio; William E. Noonan

[57] ABSTRACT

A tool for compressing valve springs including: a lever which has a spring engaging portion, a fulcrum portion spaced from the spring engaging portion and an axis which extends generally from the fulcrum portion to the spring engaging portion. A torque transmitting element is fitted to the lever and includes a torquing axis which extends transversely to the axis of the lever. The torque transmitting element is releasably engageable with an elongate shaft in order to establish axial alignment between the shaft and the torque transmitting element and enable the shaft and the torque transmitting element to rotate together. The torque transmitting element transmits to the lever rotational torque applied to the shaft, thereby pivoting the lever about the fulcrum portion to force the spring engaging portion to compress the valve spring.

17 Claims, 4 Drawing Figures

TOOL FOR COMPRESSING VALVE SPRINGS

FIELD OF INVENTION

This invention relates to a tool for compressing valve springs, and in particular to a tool for compressing the valve springs in motor vehicle engines.

BACKGROUND OF INVENTION

Repair or replacement of valves and valve seals are commonly encountered automotive repair tasks. Typically such repairs can be effected only by removing the compression spring which surrounds the valve stem and urges the valve into a closed condition. The spring is compressed so that the locking pin and washer or other locking means disposed at the end of the valve stem can be removed, thereby permitting removal of the spring itself.

Various tools are available for compressing valve springs. For example, one device employs a pair of telescoping elements for engaging opposite ends of the spring and a removable handle which fits in a complementary hole in the side of the device and which pivots back and forth to compress and decompress the spring. Another device includes a pair of spring engaging elements and a pivotably attached handle which may be operated from various angles. These tools tend to be relatively complex and include a number of movable parts. Additionally they are designed for use with older L head engines wherein the valves and valve springs are mounted in the cylinder block.

Currently, most automobile engines mount the valves and valve springs in a cylinder head. Valve spring compressor tools employed for such engines typically include an elongate handle having a forked element at one end. The forked element includes two prongs which receive a rocker arm stud between them. When the handle is pivoted upwardly the tips of the prongs bear on the spring keeper in order to compress the spring. In an alternative design, an elongate bar is fixed to the cylinder head and the tool is pivoted about the bar to compress respective springs.

Valve spring compression tools of the prior art are very often unsatisfactory for compressing springs in vans, buses and other vehicles having cramped engine quarters. In such vehicles a portion of the engine compartment may extend rearwardly under the window and dash. Access to some or all of the valve springs may be severely limited by the firewall or other parts of the engine compartment. As a result, in such vehicles it is often very difficult, if not impossible, to insert or properly manipulate the compression tools of the prior art. The handles of these devices cannot be pivoted in their intended manner and therefore the valve springs cannot be compressed. Consequently, necessary valve repairs may be delayed or neglected altogether.

SUMMARY OF INVENTION

It is therefore an object of this invention to provide an improved valve spring compressing tool which quickly and effectively compresses motor vehicle valve springs mounted in cramped and hard to reach areas in the engine compartment.

It is a further object of this invention to provide a valve spring compressing tool which may be quickly and effectively employed with virtually all motor vehicle engines wherein the valves and valve springs are mounted in a cylinder head and which effects spring compression without the need for removing the cylinder head.

This invention features a valve spring compressing tool which includes lever means including a spring engaging portion, a fulcrum portion spaced from the spring engaging portion, and an axis which extends generally from the fulcrum portion to the spring engaging portion. There are torque transmitting means, fixed to the lever means and including a torquing axis which extends transversely to the axis of the lever means, and means releasably engageable with complementary means at the end of an elongate shaft for establishing axial alignment between the shaft and the torque transmitting means and enabling the shaft and the torque transmitting means to rotate together. The torque transmitting means transmit to the lever means rotational torque applied to the shaft to pivot the lever means about the fulcrum portion and force the spring engaging portion to compress the valve spring.

In a preferred embodiment the lever means includes a bifurcated element having a pair of prongs which include the spring engaging portion, and recess means disposed between the prongs. The torque transmitting means may include a cylindrical element. The releasably engageable means may include an axial bore disposed in the torque transmitting means. In such embodiments the complementary means include an insertion member receivable by the bore. The insertion member and the bore have complementary cross-sectional shapes. Preferably, they include complementary square cross sections.

The recess means may receive a rocker arm stud which is mounted proximate the valve spring. The fulcrum portion may pivot about means, such as a nut, which is attached to the rocker arm stud. Alternatively, the fulcrum portion may pivot about an elongate bar which is mounted proximate the valve spring. The fulcrum portion may be disposed between the spring engaging means and the torque transmitting means.

This invention also features a valve spring compressing tool which includes lever means, torque transmitting means, and an elongate shaft. Such an embodiment also includes means for releasably engaging the torque transmitting means with the shaft to establish axial alignment between the torque transmitting means and the shaft, and enable the torque transmitting means and shaft to rotate together but not relative to each other. Further included may be means for applying rotational torque to the shaft.

DISCLOSURE OF PREFERRED EMBODIMENT

Other objects, features and advantages will occur from the following description of a preferred embodiment and the accompanying drawings, in which.

Figure 1:
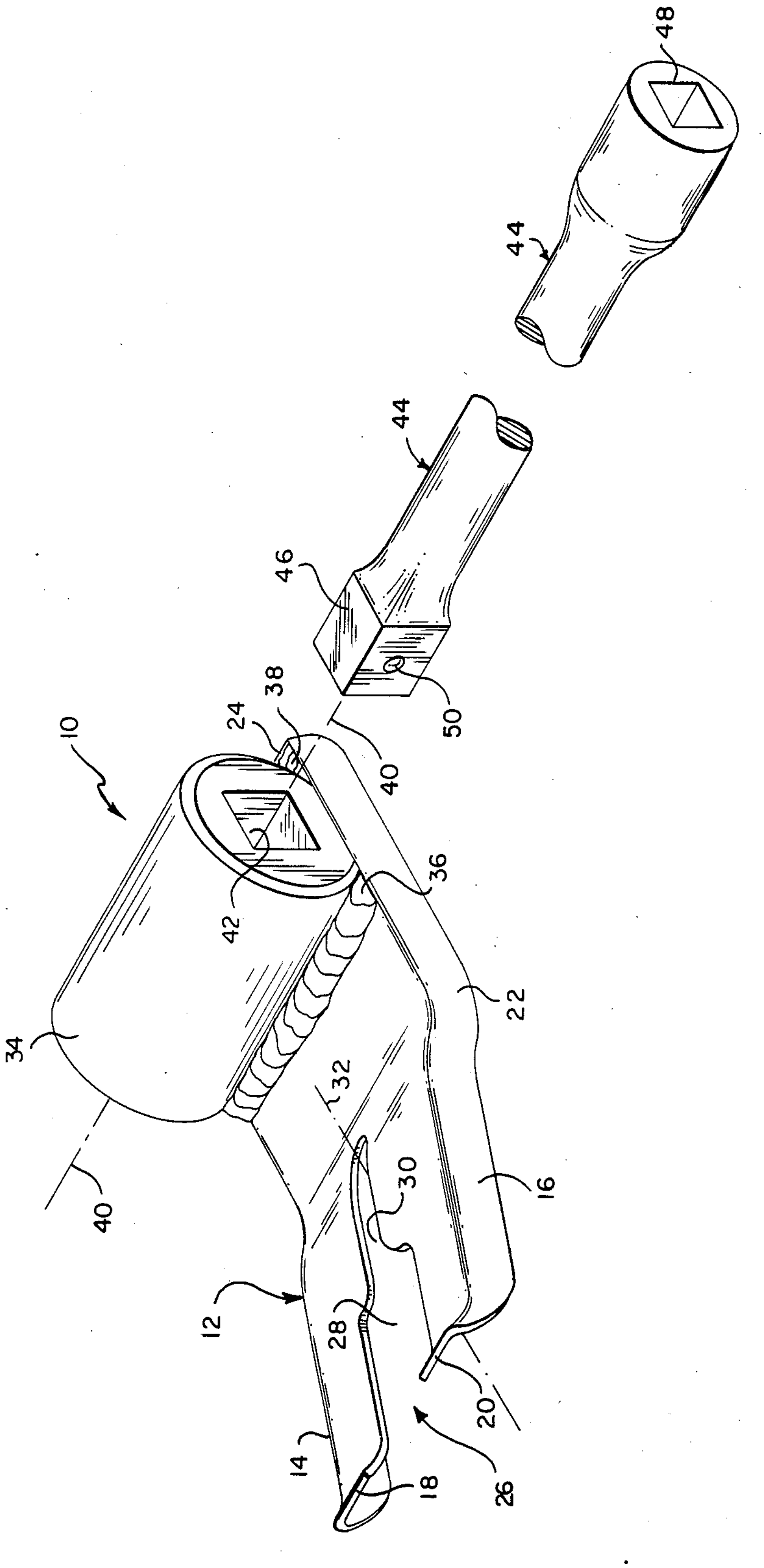
FIG. 1 is an axonometric view of a preferred embodiment of the valve spring compressing tool of this invention.

A tool for compressing motor vehicle valve springs according to this invention may be effected using lever means which include a spring engaging portion, a fulcrum portion spaced from the spring engaging portion, and an axis which extends generally from the fulcrum portion to the spring engaging portion. Typically the lever means includes an integral bifurcated element having a pair of prongs which include the spring engaging portion, and recess means disposed between the prongs. The term "spring engaging" means that the lever engages the valve spring, either directly or via a valve spring keeper washer or other retaining means at the top of the spring. Preferably the bifurcated element is composed of steel or a similarly strong metal or metal alloy.

Torque transmitting means are attached, such as by welding, to the bifurcated element. The torque transmitting means includes a torquing axis which extends transversely, and typically perpendicular, to the axis of the lever means. Again, this element contains steel or similar material. Preferably, the fulcrum portion is disposed between the spring engaging portion and the torque transmitting means. However, the torque transmitting means may be located between the spring engaging portion and the fulcrum portion. The torque transmitting means typically includes a cylindrical element. Alternatively, the torque transmitting means may assume a square, hexagonal, or other cross-sectional shape. Typically a symmetric cross section is employed.

There are means for releasably engaging the torque transmitting means and an elongate shaft. Such means establish axial alignment between the shaft and the torque transmitting means and enable the shaft and the torque transmitting means to rotate together but not relative to each other. For example, it is preferred that the torque transmitting means include an axial bore disposed therein and that the elongate shaft include an insertion member which is receivable by the bore. Typically the bore and the insertion member have complementary square cross sectional shapes. In such embodiments the shaft may be a socket wrench extension element having a square drive which complements and fits into the square bore in the torque transmitting means. Although the bore and insertion member are preferably square, various other cross sectional shapes (e.g., hexagonal, octagonal) may be employed. Moreover, in alternative embodiments the torque transmitting means may include an insertion member or drive and the shaft may include a bore or socket at one end thereof for receiving the torque transmitting means. In still other embodiments the torque transmitting means and elongate shaft need not be directly engaged. For example, both the shaft and the torque transmitting means may include an insertion member, and a connecting element having a pair of axial bores or sockets (or alternatively, a single bore therethrough) may connect the shaft and torque transmitting means. Alternatively, both the torque transmitting means and the elongate shaft may include axial bores and the connector member may include opposing axial insertion members for respectively inserting in the torque transmitting bore and the shaft bore.

Rotational torque is typically applied to the shaft by means of a socket wrench handle having a square drive. In such embodiments the socket wrench drive fits into a socket at the end of the shaft opposite the shaft's insertion member or drive. The shaft employed is long enough so that the handle may be turned in an area free from interference with the firewall or other parts of the engine housing, thereby transmitting torque to the shaft, the torque transmitting means and the bifurcated element so that the prongs compress the valve spring.

Preferably, the recess means in the bifurcated element receives a rocker arm stud nut which is mounted to the cylinder head proximate the valve spring. When the socket wrench handle is turned, the fulcrum portion of the bifurcated element pivots about means such as a stud nut attached to the rocker arm stud. Where the rocker arm stud comprises a bolt the fulcrum portion pivots about the head of the bolt. In alternative embodiments an elongate bar may be mounted to the cylinder head or other parts within the engine compartment proximate the valve spring. In such instances the fulcrum portion may pivot about the elongate bar and force the spring engaging portion to compress the valve spring. Upon completion of this task the tool may be slid along the bar and into position for compressing an adjacent spring.

There is shown in FIG. 1 a valve spring compressing tool 10 which includes lever means in the form of a bifurcated element 12 having prongs 14 and 16. The distal ends 18 and 20 of prongs 14 and 16 are curved slightly upwardly. A curved portion 22 is integrally connected to the prongs and an extension portion 24 is integrally connected to and extends upwardly from curved portion 22. A recess 26, including a wide area 28 and a narrow area 30, is disposed between prongs 14 and 16. Element 12 includes an axis of symmetry 32 which extends generally from extension portion 24 through curved portion 22, and through the recess 26 between prongs 14 and 16.

A torque transmitting cylinder 34 is welded at 36 and 38 to extension portion 24. Cylinder 34 includes an axis 40 which extends transversely (e.g. substantially perpendicular) to axis of symmetry 32 of element 12. A bore 42 having a square cross section is disposed axially in cylinder 34.

Shaft 44 includes a square insertion member 46 at one end and a socket 48 at the other end thereof. A rotatably and resiliently mounted bearing 50 is disposed in one or more of the surfaces of insertion member 46. Shaft 44 is quickly, securely, simply and releasably engaged with cylinder 34 by inserting member 46 within bore 42. Rotatable and resilient bearing 50 enables member 46 of shaft 44 to be engaged with and released from cylinder 34 using little or no effort. Additionally, when member 46 and cylinder 34 are engaged, resilient bearing 50 is urged outwardly to bear against an indent in the inside surface of bore 42, thereby enhancing a secure fit between the shaft and cylinder.

Figure 2:
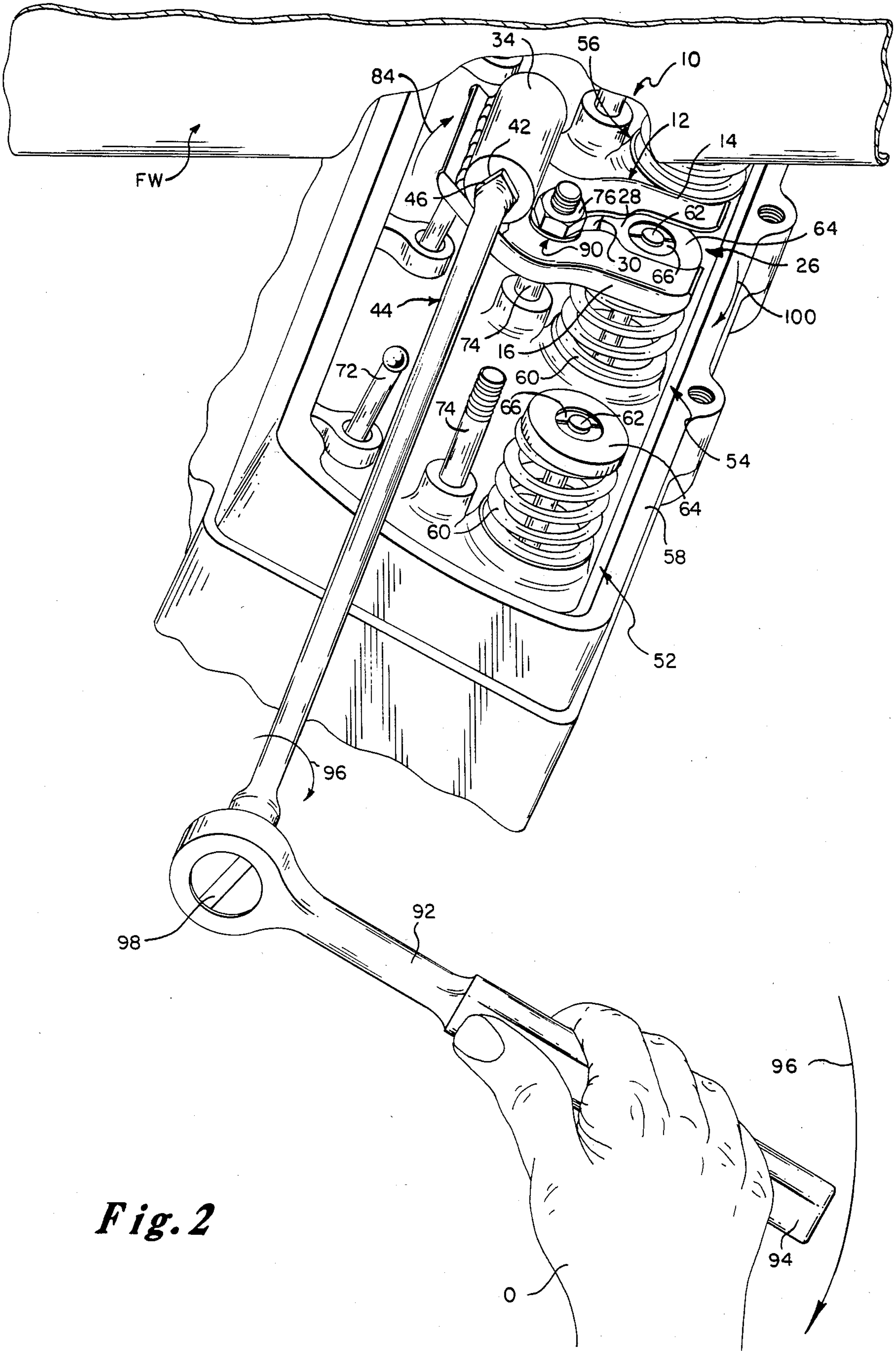
FIG. 2 is an axonometric view of the valve spring compressing tool cooperating with a rocker arm stud and stud nut to effect compression of a motor vehicle valve spring.

As shown in FIG. 2, a plurality of valve mechanisms 52, 54 and 56 are mounted to the cylinder head 58 of a motor vehicle engine. Additional valve mechanisms which may be disposed in line in the cylinder head behind mechanism 56 are obscured by firewall FW.

As represented by mechanism 52, each valve mechanism includes a compression spring 60 which is disposed about a valve stem 62 and disposed between a spring keeper washer 64 and the cylinder head 58. Washer 64 and compression spring 60 are held on valve stem 62 by a locking device such as keeper 66, which extends through the hole in washer 64 and is disposed about stem 62.

During normal operation of the engine, spring 60 is repeatedly compressed and released and the valve is opened and closed by a rocker arm (not shown) which is removed prior to the use of tool 10. One end of the rocker arm is repeatedly raised and lowered by cam actuated push rod 72, thereby causing the rocker arm to pivot about a rocker arm stud 74 having a nut 76 threadably attached at the top thereof, as shown by the stud adjacent mechanism 54. Stud 74 and nut 76 may alternatively constitute a simple integral bolt. This repeated rocking causes the opposite end of the rocker arm to be raised and lowered. When that end is lowered it bears downwardly on valve stem 62 and compresses spring 60, thereby opening the valve. When push rod 72 is lowered, the rocker arm moves upwardly and the spring 60 expands, thereby raising valve stem 60 and closing the valve.

In vehicles such as buses and vans, compression and removal of the valve springs 60 of valve mechanism 54 and those disposed rearwardly thereof may be hindered by firewall FW. The firewall restricts pivoting of the handle of conventional compressing tools in the direction of arrow 84.

Applicant's tool 10 overcomes this difficulty and is operated free of interference from firewall FW. To compress spring 60 of valve mechanism 54, bifurcated element 12 is disposed so that prongs 14 and 16 are situated above washer 64. As shown, the rocker arm associated with mechanism 54 is preferably removed to make access easier. Valve stem 62 is received by the wide area 28 of recess 26, and narrow area 30 of recess 26 receives the rocker arm stud 74 associated with mechanism 54 below stud nut 76. A fulcrum portion 90 of element 12 is disposed directly below nut 76. Insertion member 46 of shaft 44 is inserted as previously described in bore 42 of torque transmitting cylinder 34 so that shaft 44 and cylinder 34 are axially aligned. Shaft 44 extends in a forward direction and the obscured socket at its opposite end is releasably attached to an obscured complementary drive element of a ratchet or socket wrench 92.

To operate tool 10, operator O grasps handle 94 of wrench 92 and pivots the handle in the direction of arrow 96. Locking mechanism 98 of wrench 92 is set so that the wrench properly turns in the direction of arrow 96. Shaft 44 is selected to be long enough so that handle 94 may be turned without interference from firewall FW. Rotational torque is thereby applied to shaft 44 in the direction of arrow 96. The complementary cross sectional square shapes of insertion member 46 and bore 42 enable shaft 44 and cylinder 34 to rotate together and not relative to each other. Accordingly, the rotational torque applied to shaft 44 is transmitted through cylinder 34 to bifurcated element 12. Bifurcated element 12 therefore acts as a lever. Fulcrum portion 90 pivots about rocker arm stud nut 76 and spring engaging prongs 14 and 16 pivot downwardly in the direction of arrow 100 to bear on washer 64 and compress spring 60. Removal of keeper 66 and thus removal of the spring and washer themselves is thereby permitted.

Figure 3:
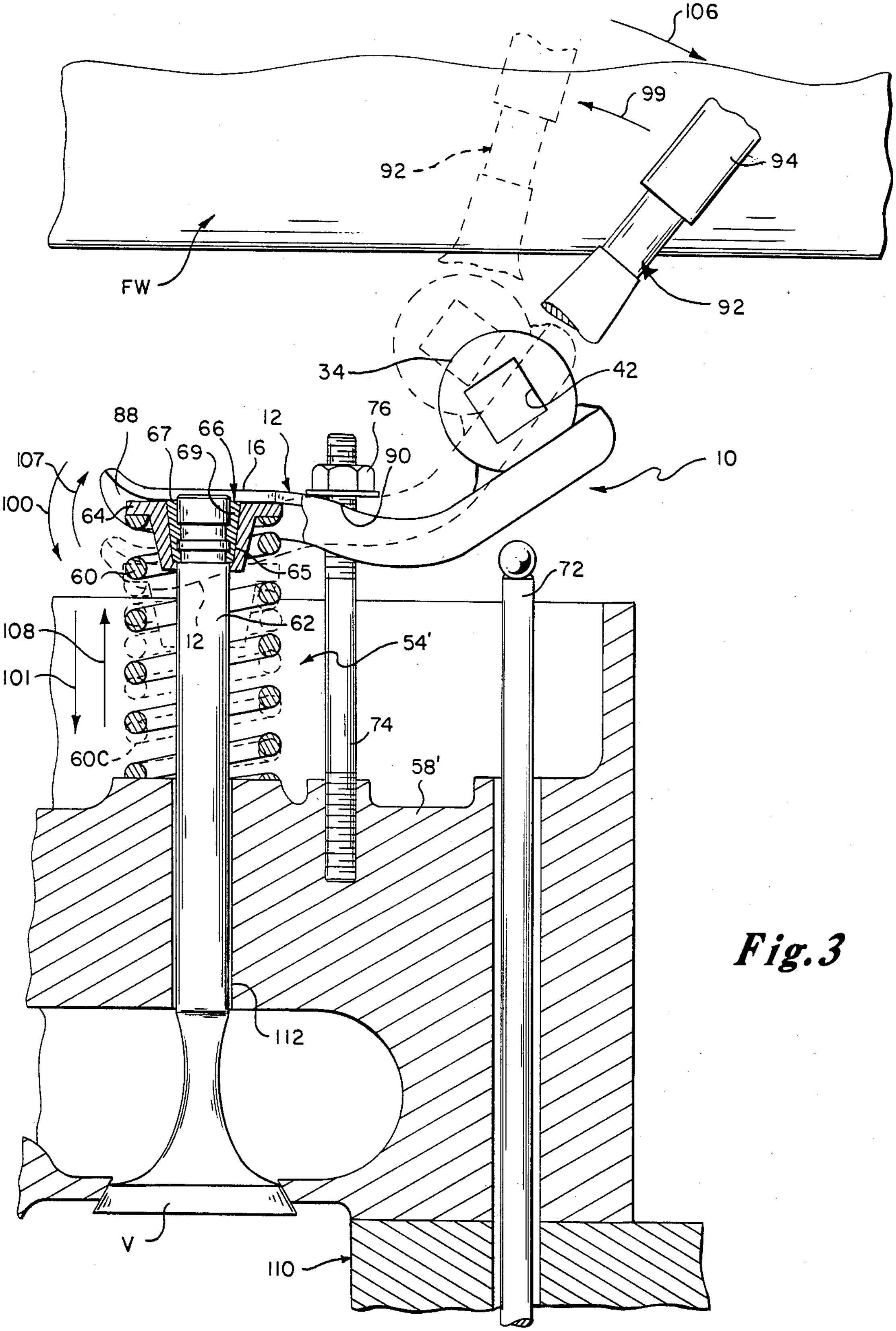
FIG. 3 is an elevational cross-sectional view of the valve spring compressing tool pivoting about the rocker arm stud and stud nut to close the valve compression spring.

This operation is illustrated further in FIG. 3, wherein the valve spring 60 of a valve mechanism 54′ on the opposite side of the engine, e.g. in cylinder head 58′, is removed. The obscured recess of tool 10 receives rocker arm stud 74 so that fulcrum portion 90 of element 12 is disposed directly below stud nut 76. Stud 74 is mounted in cylinder head 58′ between valve mechanism 54′ and push rod 72. A cam (not shown) actuates the push rod. Tool 10 is attached to wrench 92 (partly cut away) by inserting the insertion member of omitted shaft 44 into the end of bore 42 of cylinder 34 opposite the end which receives the insertion member in FIG. 2. The omitted locking mechanism of wrench 92 is likewise reversed so that the socket wrench may be properly turned in the opposite direction from that shown in FIG. 2. When handle 94 of wrench 92 is turned in the direction of arrow 99, torque is transmitted through the shaft. Square insertion member 46 rotates with square bore 42, thereby rotating cylinder 34 in the direction of arrow 99.

Fulcrum portion 90 pivots in the direction of arrow 100 about stud nut 76 and the spring engaging portions of prong 16 and cut away prong 14 bear simultaneously on washer 64, thereby urging spring 60 in the direction of arrow 101 into a compressed condition 60C.

Keeper 66 includes two tapered half-cylinder elements 67, 69, which include circumferential grooved inner surfaces for engaging the circumferentially ribbed upper end of valve stem 62. When keeper washer 64 is extended upwardly by spring 60, the tapered bore through washer 64 engages keeper 66 and the keeper thereby prevents removal of washer 64 and spring 60 from stem 62. However, when the spring is compressed washer 64 is disengaged from around keeper 66 and the keeper halves 67, 69 are separated so that the keeper is readily removed.

Following the removal of keeper 66, wrench 92 is pivoted in the reverse direction of arrow 106, back to its initial position, so that element 12 pivots upwardly about stud nut 76 in the direction of arrow 107 and spring 60 expands in the direction of arrow 108. Element 12 is then removed from around valve stem 62, and washer 64 and spring 60 are lifted upwardly and removed from around stem 62. Cylinder head 58′ may then be removed from cylinder block 110 and valve V may be easily removed from channel 112 to effect needed repairs.

To replace valve mechanism 54′, valve V is inserted back through channel 112 and cylinder head 58′ is replaced on block 110. Spring 60 is inserted over valve stem 62 and washer 64 is replaced above spring 60. Tool 10 is again used as shown in FIG. 3 to bear on washer 64 and compress spring 60 so that keeper 66 may be replaced around stem 62 and through washer 64. Tool 10 may then be removed entirely, leaving valve mechanism 54′ in its original expanded spring, closed valve position.

Figure 4:
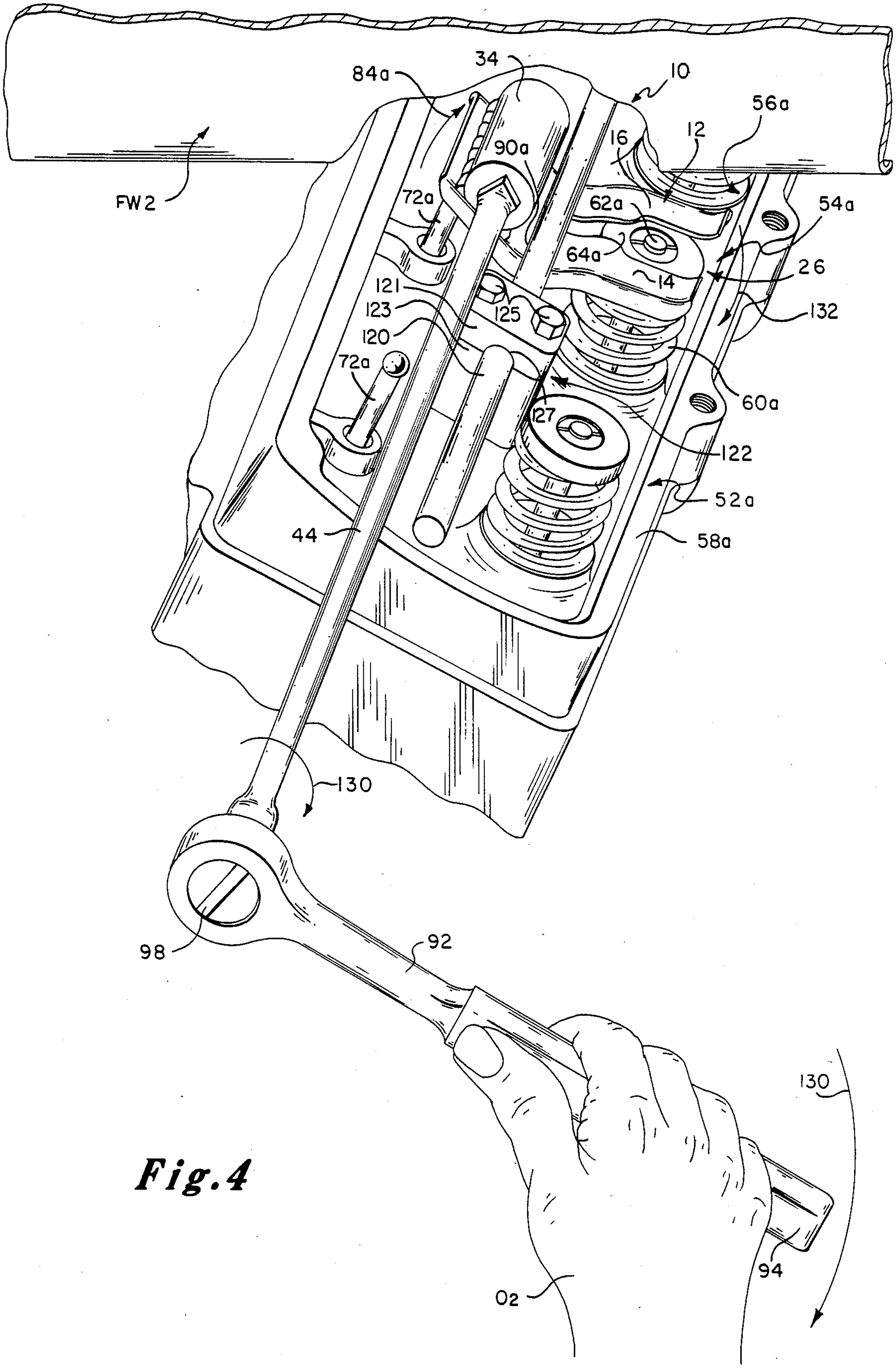
FIG. 4 an axonometric view of a valve spring compressing tool operating in cooperation with an elongate bar mounted to the cylinder head to effect closing of a valve compression spring.

In an alternative embodiment, illustrated in FIG. 4, tool 10 may be employed in cooperation with a bar 120 which is mounted to cylinder head **58*a* in a substantially parallel relationship to the alignment of the valve mechanisms 52*a*, 54*a*, 56*a*. Such a bar 120 typically is employed where a one-piece rocker arm assembly (removed in FIG. 4) is used to operate the valves. Such an assembly is mounted to the cylinder head by a plurality of mounting posts 122 (only one of which is shown) which are spaced from front to rear along the cylinder head 58*a*. Each valve mechanism again includes an associated rocker arm stud and push rod 72*a*. However, the rocker arm assembly, and therefore each of the rocker arms, has been removed so that the valve springs may be compressed by tool 10**.

Bar 120 replaces the removed rocker arm assembly, and in particular is mounted to and extends between forward post 122 and a rearward post which is obscured by firewall FW2. Specifically, post 122 includes a top portion 121 and a bottom portion 123 connected by bolts 125, and further includes an opening between the top and bottom portions when they are bolted closed. Top portion 121 and bottom portion 123 are separated and bar 120 is positioned so that each end thereof extends through an opening in a respective post 122 when the top and bottom portions of post 122 are bolted together.

Firewall FW2 limits the pivoting of handles of valve spring compressing tools of the prior art in the direction of arrow 84*a*. Therefore, to compress a valve spring 60*a* of mechanism 54*a*, tool 10 is operated as follows. Bifurcated element 12 is inserted beneath bar 120 so that spring engaging prongs 14 and 16 are situated above compression spring keeper washer 64*a*. Again, valve stem 62*a* is received by recess 26. Element 12 includes a lateral fulcrum portion 90*a* which is situated beneath bar 120.

Shaft 44 is releasably connected with torque transmitting cylinder 34. A socket or ratchet wrench 92 is connected to the other end of shaft 44. Again, the shaft selected should be long enough so that handle 94 of wrench 92 can be turned freely without encountering interference from firewall FW2.

To compress spring 60*a*, operator O2 grasps handle 94 of wrench 92 and turns the handle in the direction of arrow 130. Locking mechanism 98 is switched into the appropriate position so that wrench 92 may be properly turned in the direction of arrow 130.

Torque is transmitted in the direction of arrow 130 through shaft 44 and cylinder 34 to element 12. Fulcrum portion 90*a* thereby pivots about bar 120 and the spring engaging prongs 14 and 16 are leveraged downwardly in the direction of arrow 132 to bear on washer 64*a* and compress spring 60*a* of mechanism 54*a*. When repair or replacement of valve mechanism 54*a* is completed, tool 10 may be simply slid along under bar 120 and positioned for effecting compression of the spring 60*a* of an adjacent valve mechanism, for example, mechanism 56*a*.

Other embodiments will occur to those skilled in the art and are within the following claims:

What is claimed is:

1. A valve spring compressing tool comprising:

lever means including a spring engaging portion, a fulcrum portion spaced from said spring engaging portion, and an axis which extends generally from said fulcrum portion to said spring engaging portion; and torque transmitting means fixed to said lever means and including a rotational axis which extends transversely to said axis of said lever means, and means releasably engageable with complementary means at the end of an elongate shaft for establishing axial alignment between said shaft and said rotational axis and enabling said shaft and said torque transmitting means to axially rotate together;

said torque transmitting means transmitting, to said lever means, rotational torque applied to the shaft to pivot said lever means about said fulcrum portion and force said spring engaging portion to compress the valve spring.

2. The tool of claim 1 in which said lever means includes a bifurcated element having a pair of prongs which include said spring engaging portion, and recess means disposed between said prongs.

3. The tool of claim 2 in which said recess means receives a rocker arm stud mounted proximate the valve spring.

4. The tool of claim 3 in which said fulcrum portion pivots about means attached to the rocker arm stud.

5. The tool of claim 4 in which the means attached to the rocker arm stud includes a nut.

6. The tool of claim 1 in which said torque transmitting means includes a cylindrical element.

7. The tool of claim 1 in which said releasably engageable means includes an axial bore disposed in said torque transmitting means and said complementary means includes an insertion member receivable by said bore, said insertion member and said bore having complementary cross sectional shapes.

8. The tool of claim 7 in which said bore and said insertion member include complementary square cross sections.

9. The tool of claim 1 in which said fulcrum portion pivots about an elongate bar mounted proxiamte the valve spring.

10. The tool of claim 1 in which said fulcrum means is disposed between said spring engaging means and said torque transmitting means.

11. A valve spring compressing tool comprising:

lever means including a spring engaging portion, a fulcrum portion spaced from said spring engaging portion, and an axis which extends generally from said fulcrum portion to said spring engaging portion;

torque transmitting means, fixed to said lever means and including a rotational axis which extends transversely to said axis of said lever means; and an elongate shaft connected at one end to said torque transmitting means and having a longitudinal axis which is alinged with said rotational axis of said torque transmitting means to enable said torque transmitting means and said shaft to axially rotate together;

said torque transmitting means transmitting, to said lever means, rotational torque applied to said shaft to pivot said lever means about said fulcrum portion and force said spring engaging portion to compress the valve spring.

12. The tool of claim 11 further including means for applying rotational torque to said shaft.

13. The tool of claim 11 in which said lever means includes a bifurcated element having a pair of prongs, which include said spring engaging portion, and recess means disposed between said prongs.

14. The tool of claim 11 in which said torque transmitting means includes a cylindrical element.

15. The tool of claim 11 further including means for releasably connecting said torque transmitting means with said shaft.

16. The tool of claim 15 in which said means for releasably connecting includes an axial bore disposed in said torque transmitting means and an insertion member carried at one end of said shaft and receivable by said bore, said insertion member and said bore having complementary cross sectional shapes.

17. The tool of claim 16 in which said bore and said insertion member include complementary square cross sections.

* * * * *